Nov. 28, 1933. R. HINKLE 1,937,385
MIXING AND SIFTING MACHINE FOR DRY POWDERED MATERIALS
Filed Dec. 17, 1931 3 Sheets-Sheet 1

Inventor
RAYMOND HINKLE

By Richey & Watts

Attorneys

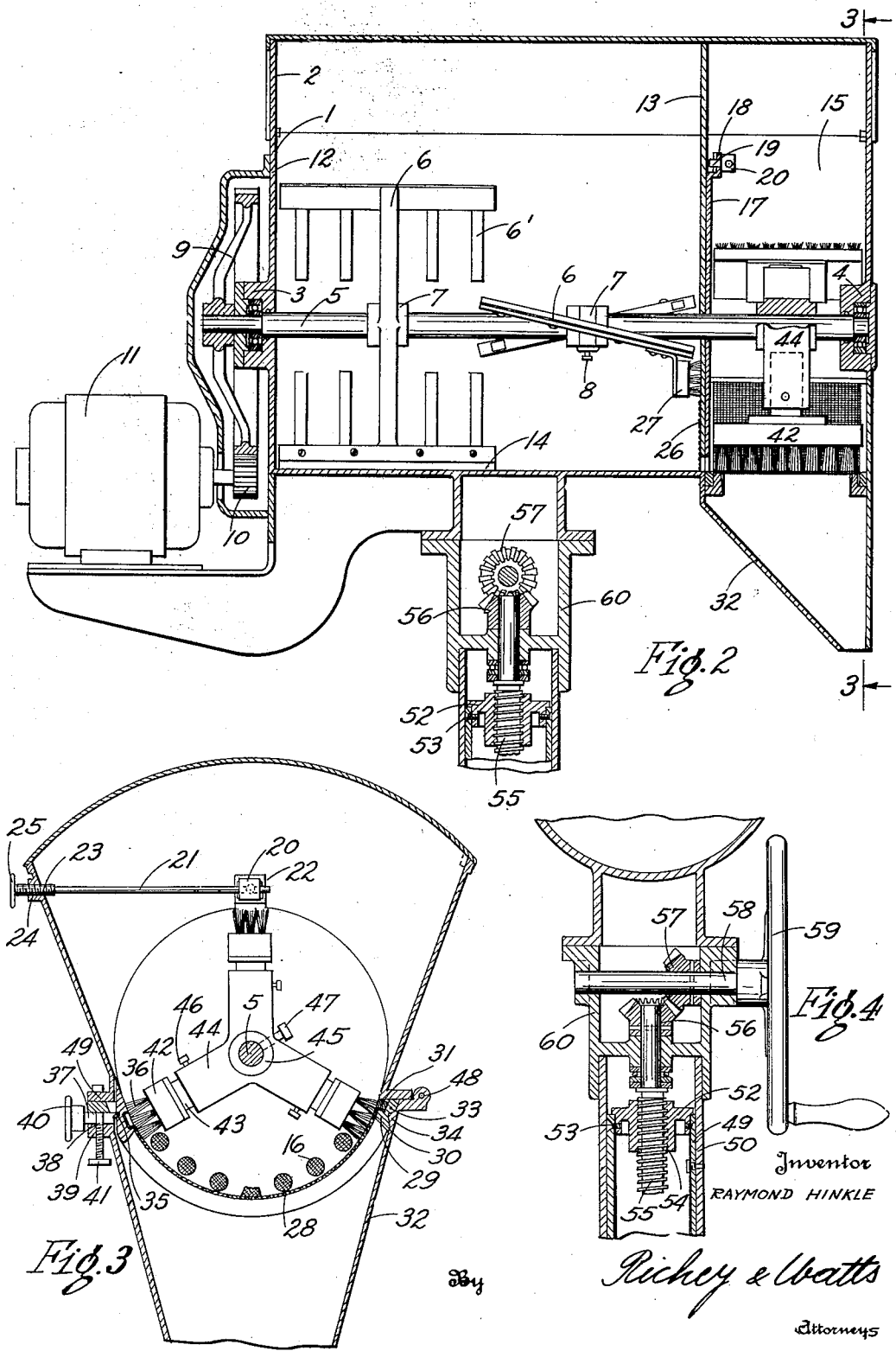

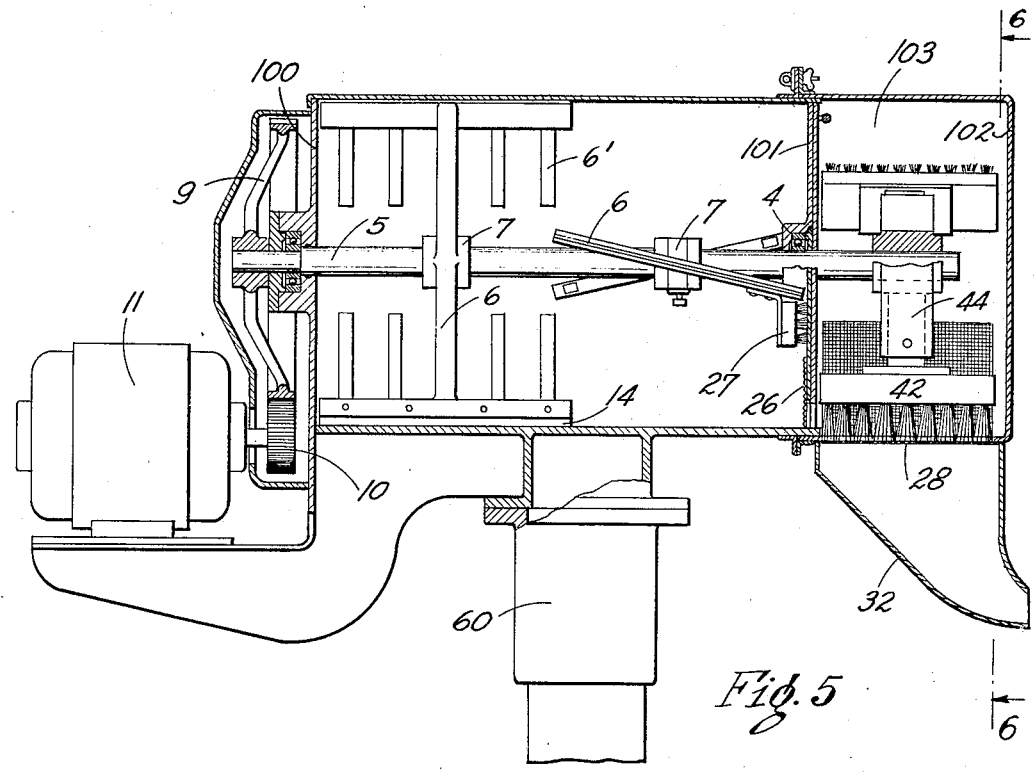
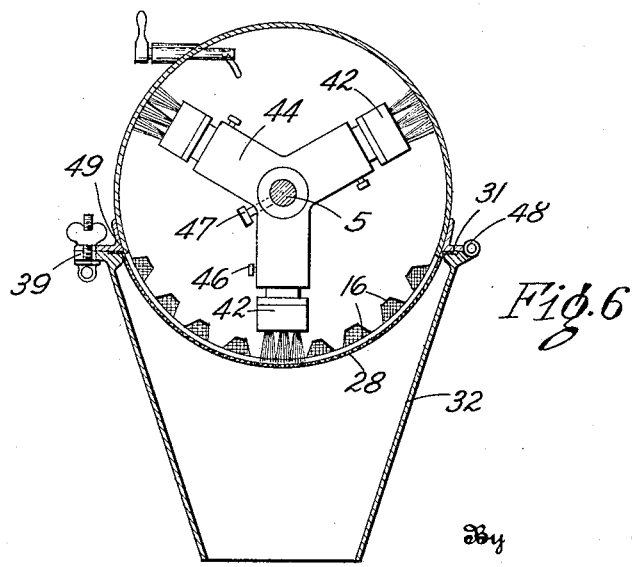

Patented Nov. 28, 1933

1,937,385

UNITED STATES PATENT OFFICE 1,937,385

MIXING AND SIFTING MACHINE FOR DRY POWDERED MATERIALS

Raymond Hinkle, York, Pa.

Application December 17, 1931. Serial No. 581,567

7 Claims. (Cl. 209—235)

This invention relates to the art of mixing dry, finely comminuted materials, and especially to the preparation of mechanical mixtures of the ingredients for cakes and similar baked food stuff. This invention also relates to the art of mixing powders such as are used for cosmetics and powdered drugs.

In the manufacturing of cakes and the like it is desirable to so prepare the flour as to include a considerable volume of air which is necessary in order to produce a light cake. In order that the finished cake may be of uniform consistency throughout, it is necessary that the leavening ingredients incorporated therein be uniformly distributed throughout the batter. Due to the nature of the material that is to be mixed a more uniform consistency in the finished product may be obtained by mixing the dry powders while in powder form rather than mixing the leavening ingredients into the batter. In the preparation of the batter from which the cake is to be made, it is essential that the dry ingredients be introduced into contact with the wet ingredients not more rapidly than the wet ingredients will absorb and properly mix with the dry ingredients, otherwise the dry ingredients if introduced too rapidly will form lumps thereby causing localization of the leavening ingredients within the body of the cake which ultimately results in a product lacking uniformity of texture and quality. Where the dry ingredients have been introduced into the batter too rapidly it has been common practice to continue the preparation of the batter for a greater length of time than is necessary for properly mixing in order that the lumps may be eliminated but, in so mixing the batter, the flour is caused to glutenize and the aeration is reduced and the resulting cake is fibrous and tough.

Heretofore it has been common practice in preparing the dry ingredients for cakes to weigh the proper amount of each material, then to pass the flour and other dry ingredients through a small sieve either manually or mechanically operated into a suitable vessel, then to transfer the sifted flour and admixed materials from the vessel into the mixing machine along with the milk and other liquid ingredients. This practice has many faults. The ingredients are not properly mixed by the sieving operation due to the fact that the leavening ingredients are added on top of the flour and are last to pass through the machine or even if the leavening ingredients and flour are mixed by hand before sifting, the resulting sifted mixture is not uniform throughout. Also, when the dry ingredients are received in the vessel after having passed through the sieve a large part of the beneficial effect of the sifting operation is eliminated by the packing action of the dry powders within the vessel. So that when those ingredients are introduced into the mixing machine they are not properly aerated. In some instances the dry ingredients as they are being introduced into the mixing machine are sifted at that time but this is possible only where a horizontal batter mixer is used and in those instances the volume of batter prepared is so large that hand methods are not practical. Where the hand methods are usually employed vertical batter mixing machines are used and the opening at the top of the batter mixing machine to receive the dry ingredients is too small to permit the proper sifting of the materials into the batter mixing machine so that it is necessary to dump the dry ingredients into the vertical batter mixing machine in bulk. Such a manual method of preparing a cake batter necessarily involves the indeterminate human element so that a uniform run of cake batter is difficult to obtain.

Where large quantities of batter are prepared at a time, the flour is transferred by a screw type conveyor from a bin to a sifting machine through which the flour passes to a weighing flour hopper and the weighed flour is then introduced into the horizontal batter mixing machine either in bulk or through another power sieve. The leavening ingredients are then added in bulk form to the other ingredients in the batter mixing machine. This practice of preparing cake batters has many faults. Due to the fact that the leavening ingredients are added to the batter in the mixing machine in bulk instead of being thoroughly mixed in dry form with the flour, the leavening ingredients are not uniformly distributed throughout the body of the batter and as a consequence the leavening action is localized in the body of the cake causing large holes and lack of uniformity in rising, texture and tasting quality of the cake. In addition, due to the construction of the weighing hopper and apparatus for introducing the flour into the batter mixer, the flour is introduced at a predetermined rate which cannot be varied so that, in some instances, the flour may be introduced more rapidly than it can be properly combined with the liquid ingredients of the batter, resulting in the formation of lumps which, if allowed to remain, causes lack of uniformity in the cake or which, if eliminated by overmixing, causes gluten development of the flour, which in turn produces a tough and fibrous cake. Also in the transfer of the flour from the hopper to the first sifting machine by a screw conveyor, the flour is packed more tightly, thereby putting it into such a condition as to make it more difficult to sieve. Also the advantage of mixing the dry ingredients while in dry form is not present.

Accordingly it is an object of this invention to provide a mixing apparatus which will prepare the flour and other dry ingredients for cakes in uniformly mixed condition while in dry form.

Another object of the invention is to provide an apparatus for first thoroughly mixing the dry ingredients of a cake or the like in dry form and ultimately sifting the mixture.

Another object of the invention is to provide an apparatus for feeding the mixture of dry ingredients of a cake or the like at a constant speed which speed may be adjusted as desired.

Another object of the invention is to provide an apparatus for thoroughly mixing such dry ingredients as flour and leavening substances and introducing the mixture in sifted form directly into the batter of a vertical cake batter mixing machine.

Another object of the invention is to provide an apparatus for completely mixing flour or leavening ingredients and for sifting the same into a batter without the introduction of the human element and for sifting the same into a batter mixer at the desired rate without the intervention of the human element.

Another object of the invention is to prepare, in completely mixed form, flour and leavening ingredients and to introduce the same into a batter without intermediate packing of the mixture.

Another object of the invention is to provide a multiple sieving action, without intermediate handling, of dry ingredients wherein the effectiveness of subsequent sieving actions is conditioned by the rate of previous sieving actions.

Another object of the invention is to provide a multiple sieving action such that the volume of dry material disposed on a subsequent sieve of finer mesh is conditioned by the action of the previous sieve.

Another object of the invention is to provide a novel method of handling and preparing, in large quantities, the dry ingredients for cakes and the like without the use of conveyors or the like for transporting the material.

Another object of the invention is to provide a method for preparing and handling materials for cakes and the like combining the operations of mixing the dry ingredients, transporting the same and sifting the same into the batter.

Other objects and advantages of the invention will appear in the following detailed description taken in connection with the accompanying drawings in which, Figure 1 is a view in elevation of the machine of my invention associated with a batter mixing machine.

Figure 2 is a longitudinal cross sectional view of the machine of my invention.

Figure 3 is a cross section taken on line 3—3 of Fig. 2.

Figure 4 is a detail view in cross section of the mechanism for raising and lowering the mixing machine.

Figure 5 is a view in cross section similar to Fig. 3, but showing a modified form of my invention.

Figure 6 is a view in longitudinal cross section showing the modified form of my invention.

Figure 1:
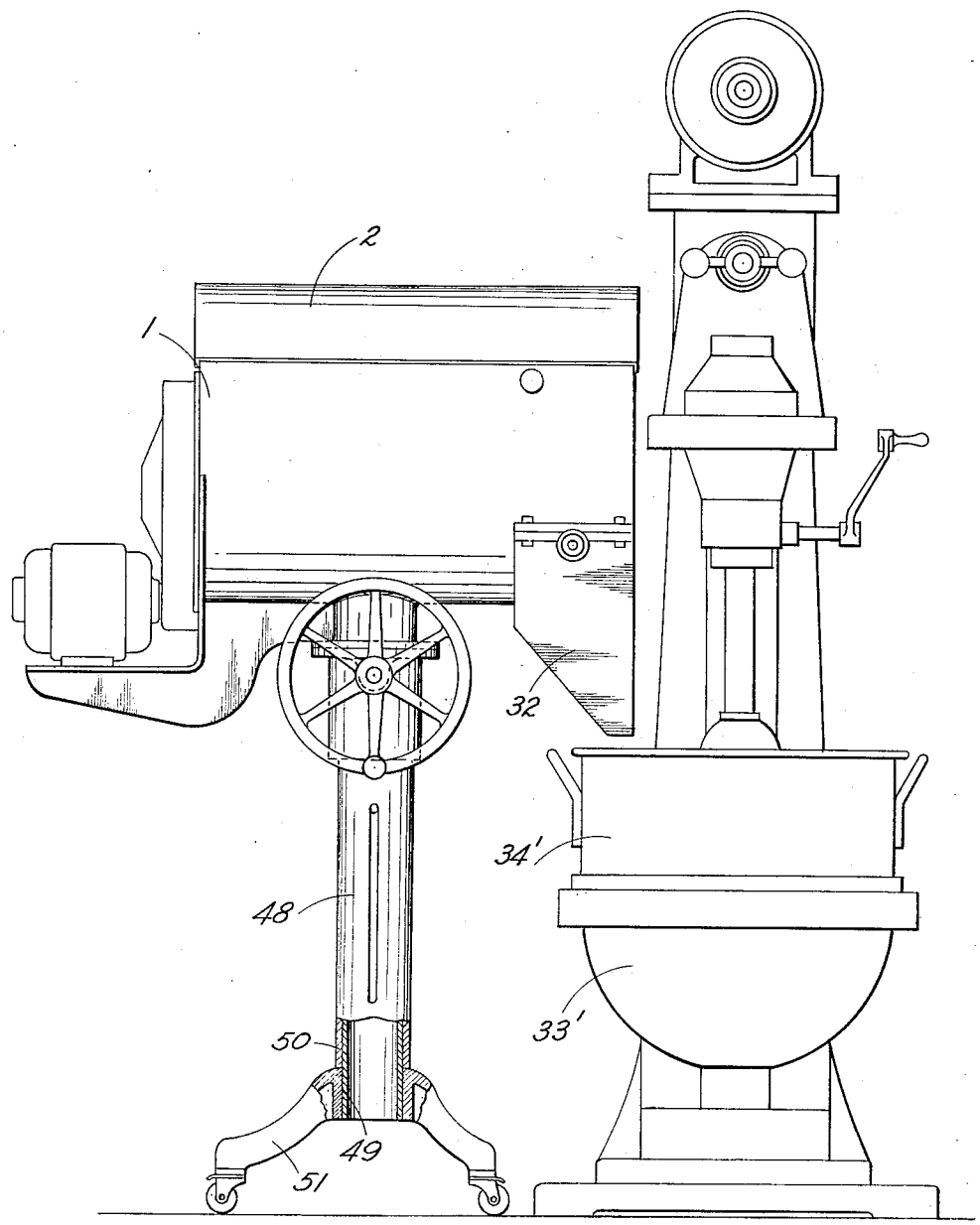

According to my invention I provide a hopper 1 to receive the flour, baking powder, cream of tartar, salt and sugar and the like to be mixed while in dry form. The hopper 1 is provided with a cover 2 which may be fitted over the hopper to close the same and may be removed to permit introduction of the powdered materials. The hopper 1 is provided with bosses 3 and 4 at its ends adapted to receive a shaft 5 journalled therein.

The shaft 5 carries mixing paddles 6 integral with hubs 7 which may be adjustably secured to the shaft as by set screws 8. The paddles 6 are provided with inwardly extending fingers 6' to insure a thorough mixing throughout the body of the materials in the hopper. The shaft 5 has mounted on one end thereof a gear 9 meshing with gear 10 carried upon the shaft of motor 11. Operation of the motor 11 turns the paddles 6 within the hopper. The motion of the paddles 6 within the hopper 1 effectively mixes the various dry ingredients therein. The dry ingredients are held within the hopper during the mixing operation by the end walls 12 and 13 and the paddles 6 are provided with rubber members 14 on their outer margins to scrape the lower surface of the hopper 1 and prevent the materials being mixed from adhering to the bottom surface of the hopper. The blades 6 are supported at such pitch and the shaft 5 turned in such direction as to provide a screw-like action to move the materials from the left end of the hopper to the right end thereof as viewed in Figure 2.

After the materials have been thoroughly mixed within the hopper 1 they are then passed into the chamber 15 which is a continuation of the hopper 1 but separated therefrom by the partition 13. In order to permit the passage of the dry materials from hopper 1 into chamber 15 the partition 13 is provided with apertures 16 along the lower margin thereof which during the mixing operation are covered by the margin of plate 17 juxtaposed to the partition 13 and mounted for rotation about the shaft 5. The plate 17 is provided with an off-set portion 18 through which a pin 19 projects, the pin 19 being integral with block 20, through which block 20 the shaft 21 passes. The shaft 21 is held against longitudinal movement relative to block 20 by cotters or other suitable means. The shaft 21 is provided with a threaded portion 23 threaded into lug 24 formed on the side wall of the hopper 1. Rotation of the shaft 21 by manipulation of the knob 25 exterior of the hopper effects rotative adjustment of the plate 17 to cover or uncover the apertures 16 to varying degrees of opening. Thus operation of the discs 17 permits the mixed materials to pass from the hopper 1 to the chamber 15 at the desired time. Alternatively, the apertures 16 may be replaced by a single opening, or, alternatively, the apertures 16 may be selectively covered and uncovered.

According to the use to which the invention is to be put the apertures 16 may be unobstructed in which case the mixed materials pass directly therethrough and are sieved at a later time; alternatively a screen 26 may be secured to the marginal portion of the partition 13 so as to cover the apertures 16 on the hopper side of the partition 13. Such a screen 26 provides an additional sieving action for the dry materials as they pass from the hopper 1. In order to insure the passage of the mixed materials from the hopper 1 to the screen 26 brushes 27 are fastened upon one pair of the paddles 6 in such position that they will sweep over the screen 26 in the region of the apertures 16 thereby acting to brush the mixed materials through the screen 26.

While for some purposes a single screening action may be sufficient in which case the mixed materials, after passing through the screen 26, may then be introduced into a cake mixing machine to be incorporated in the batter if desired. In such case the chamber 15 is not provided and the parts illustrated in that chamber in the drawings are eliminated.

Alternatively, the mixed materials, after passing through the screen 26 into the chamber 15, may be sieved again through the screen 28. The screen 28 is supported in a rectangular frame 29, the margins of this screen being held in grooves 30, formed in the frame 29, by bars 31. The frame 29 is supported upon a funnel-like construction 32, the frame 29 being provided at one side with a groove 33 adapted to receive projection 34 formed in the metal of the funnel 32. On the other side of the frame 29 there is formed a groove 35 adapted to receive a pin 36 formed on the end of rod 37 and extending eccentrically therefrom. The rod 37 extends through an aperture 38 formed in lug 39 integral with the funnel 32. The rod 37 is provided with a head 40 by which the rod 37 may be turned thereby swinging pin 36 about the axis of the rod 37 and raising or lowering that side of the frame 29 which supports the screen 28 thereby adjusting the screen 28. A set-screw 41 is threaded into the lug 39 and may be screwed into engagement with the rod 37 to hold the same in adjusted position.

In order to obtain an effective and rapid sieving action through the screen 28 brushes 42 are provided to sweep over the inner surfaces of the screen which brushes are carried upon rods 43 adjustably supported by arms 44 of the spider 45, set-screws 46 being provided to secure the brushes 42 in adjusted position on the spider 45. The spider 45 is carried upon axle 5 and fixed relative thereto by set-screws 47. Rotation of the shaft 45 by the motor 11 sweeps the brushes 42 over the screen 28 to sift the mixed cake ingredients therethrough. The sifted mixture passes out through funnel 32 and into a suitable cake mixing machine such as illustrated at 33' in Figure 1.

The batter mixing machine 33' is of the vertical type, most commonly used, and the vessel 34' in which the batter is mixed is of such size as to render it impractical to sift flour and like materials into that vessel manually. However by my invention I provide sifting means and a chute 32 so constructed and arranged as to be conveniently used for the direct introduction of the sifted materials into the vessel 34'.

The adjustment for the screen 28 provided by manipulation of the knob 40, as before described, provides for the proper spacing of that screen relative to the brushes 42 for the most effective sifting action. Likewise the adjustable mounting for the brushes 42 is provided to take up wear on the brushes. The funnel or chute 32 is hinged to the hopper 1 as is indicated at 48 and, at the other side of the chute, it is secured to the flange 49 formed on the hopper 1 by screws or clamps or in any other suitable manner. The chute 32 may be released from the hopper 1 and turned about its hinge 48 carrying the screen 28 with it so that the interior surface of the screen may be made accessible for cleaning purposes.

Thus an apparatus is provided for thoroughly mixing in the hopper 1 the dry ingredients for making cakes and the like such as flour, baking soda, cream of tartar, sugar and salt and after having been thoroughly mixed the mixture is sifted either once or twice as desired and fed directly into the batter mixing machine. In order that the mixture may be introduced into the batter at the proper rate the adjustment provided by the plate 17 for more or less covering or uncovering the apertures 16 permits ready control of the rate at which the mixture passes from the hopper 1 entering directly into the chute 32 or through the screen 28 and then through the chute 32. Thus regulation of the rate of feed of the mixture into the batter is provided.

By introducing the mixture directly from the last screen into the batter mixing machine, packing of the mixture is prevented. By introducing the ingredients in thoroughly mixed condition and at the proper rate of speed they are combined with the liquids to form a batter of uniform consistency which will produce a cake of uniform consistency and quality. By introducing the ingredients in thoroughly mixed form directly from a sieve instead of introducing them in bulk, the formation of lumps in the batter and the consequent necessity of overmixing to remove the lumps which results in imperfections in the cake is eliminated. Also since the materials are handled entirely by the machine of my invention, after having been once introduced therein, until they are introduced into the batter mixing machine the human element is eliminated.

The machine of my invention is mounted upon a suitable support such as the pedestal indicated generally at 48, Figure 1 of the drawings. The support 48 is preferably made adjustable and in the particular form illustrated in the drawings the adjustment is provided by arranging tube 49 telescopically within the tube 50, the tube 49 being carried by the base 51. A flange 52 is secured to the upper end of the tube 49 in any suitable manner as by screws 53 and the flange 52 is provided with a threaded aperture 54 in which the screw 55 is arranged. A bevel gear 56 is pinned to the upper end of the shaft 58, screw 55 and a bevel gear 57 meshes with the bevel gear 56. The bevel gear 57 is pinned upon shaft 58 to which is fixed the hand wheel 59. The shaft 58 is journalled in the head 60 carried upon the end of the sleeve 50. Rotation of the hand wheel 59 turns the screw 55 in flange 52 to raise or lower the sleeve 50 relative to the sleeve 49, thereby raising or lowering the machine of my invention.

By providing an adjustable support for the machine of my invention it is possible to adjust the machine to such height as to readily receive the flour, baking powder and other ingredients from storage bins, to mix those ingredients within the hopper 1 and, at the same time, transport the mixture from the supply of ingredients to a batter mixing machine thereby eliminating the necessity for other means of conveying the mixture to the batter mixing machine.

An alternative form of my invention is illustrated in Figures 5 and 6 where the hopper 100 is made in cylindrical form so that the rubber strips 14 arranged upon the blades 6 may sweep the surfaces of the hopper throughout its circumference preventing any of the ingredients from adhering to any portion of the surface. Thus any undesirable residue of any of the ingredients remaining within the hopper 100, which would contaminate a succeeding mixture, is eliminated. The chamber 15 in the modified form of the invention is formed between the partition 101 and the outer wall 102 of a cap 103 arranged to be fitted upon the end of the hopper 100. By so mounting the cap 103 on the hopper 100, a slight space between the upper surface of the cap 103 and the brushes 42 is provided so that undue friction between the brushes 42 and the upper surface of cap 103 is prevented. The cap 103 carries the chute 32 and the screen 28 in the same manner as described in connection with Figure 3. The operation of the form of invention illustrated in the Figures 5 and 6 being similar to that of the modified form, illustrated in the other figures of the drawings.

While the invention has been described as particularly applied to mixing the ingredients for making cakes it is obvious to one skilled in the art that the machine may be employed for mixing dry powdered materials such as are employed in making cosmetics and powdered drugs. Also the machine may be employed to prepare mixtures of flour and other baking ingredients to manufacture dry baking mixtures in prepared form for home use. While particular forms of the invention have been described in detail by way of illustration it will be obvious to one skilled in the art that modifications in the construction and arrangement thereof may be made without departing from the spirit and scope of the invention as defined in the following claims.

What I claim is:

1. A machine for mixing and sifting dry powdered materials having separate mixing and sifting compartments, passages for passing materials from one compartment to the other, mixing and aerating means in the mixing compartment operating to move the materials through said passage in aerated condition, and a relatively movable brush and screen in the sifting compartment operated simultaneously with the mixing means.

2. In a machine for mixing batches of dry finely divided materials, a horizontally-disposed stationary receptacle provided with a closable mixing and aerating compartment and a final sifting compartment open to discharge, a vertically disposed partition between said compartments provided with passageways to permit the passage of mixed and aerated materials from one compartment to the other, means for opening and closing said passageways, means including a rotatable horizontal shaft and paddles thereon certain of which are inclined relative to the shaft for mixing and aerating in the first-named compartment and progressing the materials toward the sifting compartment and into the sifting compartment upon opening of said passageways.

3. In a machine for mixing batches of dry finely divided materials, a closable horizontally disposed mixing and aerating compartment and a horizontal final compartment having an arcuate sifting screen, a vertically disposed partition between said compartments provided with passageways to permit the passage of said materials from one compartment to the other, means for adjustably opening and closing said passageways, a rotatable shaft in said chambers, means including paddles mounted on said shaft for mixing and aerating said materials in said first-named compartment and for progressing the materials toward said second-named compartment and through the partition when the passageways are open, and means engaging the screen and mounted on said shaft in said second-named compartment for sifting the materials through said screen.

4. A machine for mixing batches of dry finely divided materials comprising a horizontally disposed closable receptacle, a vertically disposed partition in said receptacle dividing the latter into a mixing and aerating compartment and a final sifting compartment, said sifting compartment being provided with an arcuate screen above an outlet and said partition being provided with passageways connecting one chamber with the other, means for adjustably opening and closing said passageways, a common shaft extending through said compartments and partition, spirally disposed mixing and aerating blades mounted on said shaft in said first named compartment and adapted to advance the mixed and aerated materials into the sifting compartment upon opening of said passageways, and means mounted on said shaft for brushing the materials through the screen of said final sifting compartment.

5. A machine for mixing batches of dry finely divided materials comprising a casing having a vertically disposed partition therein which divides the casing into a mixing and aerating compartment and a final sifting compartment, said partition being provided with passageways connecting one compartment with the other, means for adjustably opening and closing said passageways, said final sifting compartment being provided with a screened outlet, a chute adapted to receive materials from said outlet, a common shaft extending through said casing and said partition, spirally disposed mixing and aerating blades mounted on said shaft in said first-named compartment, said blades acting to mix and aerate the materials and simultaneously progress it toward said partition and into the screening compartment upon opening of said passageways, means on the one extremity of said blades for urging the materials through said passageways, and means also mounted on said shaft for brushing the materials through said screened outlet directly into said chute.

6. In a machine for mixing and sifting dry finely divided materials, the combination of a vessel having a compartment, means for mixing and aerating the said materials therein, a second compartment, means for sifting the materials from the second compartment, a vertical partition separating said compartments and having apertures to permit the passage of the mixed and aerated materials from the first compartment to the second compartment, screening means at the apertures through which the materials may pass, said mixed and aerated materials being advanced to and through the apertures by the said mixing and aerating means.

7. In a machine for mixing aerating and sifting dry finely divided materials, the combination of a fixed casing having two horizontal aligned chambers, a vertical partition separating the chambers and having controllable passages therethrough, a rotatable shaft in said chambers, paddle means on the shaft in the first chamber for mixing and aerating dry finely divided materials therein and brush means on the shaft to propel the mixed and aerated materials through the passages into the other chamber, a sifting screen in the second chamber and brush means on the shaft in said second chamber to sift said material through said screen.

RAYMOND HINKLE.